(12) United States Patent
Cho et al.

(10) Patent No.: US 10,408,286 B2
(45) Date of Patent: Sep. 10, 2019

(54) METHOD FOR PREVENTING BURST OF CLUTCH FOR VEHICLE

(71) Applicants: HYUNDAI MOTOR COMPANY, Seoul (KR); KIA MOTORS CORPORATION, Seoul (KR)

(72) Inventors: Sung Hyun Cho, Yongin-si (KR); Young Min Yoon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 3 days.

(21) Appl. No.: 15/828,918

(22) Filed: Dec. 1, 2017

(65) Prior Publication Data

US 2019/0093715 A1 Mar. 28, 2019

(30) Foreign Application Priority Data

Sep. 25, 2017 (KR) .......................... 10-2017-0123672

(51) Int. Cl.
*F16D 48/06* (2006.01)
*F16H 61/16* (2006.01)

(52) U.S. Cl.
CPC ............ *F16D 48/06* (2013.01); *F16H 61/16* (2013.01); *F16D 2500/10412* (2013.01); *F16D 2500/30806* (2013.01); *F16D 2500/3108* (2013.01); *F16D 2500/3115* (2013.01); *F16D 2500/31426* (2013.01)

(58) Field of Classification Search
CPC ............ F16D 48/06; F16D 2500/3115; F16D 2500/31426; F16D 2500/30806; F16D 2500/3108; F16D 2500/10412; F16H 61/16
See application file for complete search history.

(56) References Cited

U.S. PATENT DOCUMENTS

| 5,277,286 A * | 1/1994 | Yamamoto | B60W 30/1819 188/DIG. 1 |
| 2004/0059494 A1* | 3/2004 | Yoneda | B60K 23/04 701/89 |
| 2004/0138024 A1* | 7/2004 | Kano | B60W 10/11 477/74 |
| 2012/0158224 A1* | 6/2012 | Naqvi | B60W 30/1846 701/22 |

FOREIGN PATENT DOCUMENTS

| JP | 5261758 B2 | 8/2013 |
| JP | 5548181 B2 | 7/2014 |
| JP | 2014134273 A | 7/2014 |

* cited by examiner

*Primary Examiner* — David J Hlavka
(74) *Attorney, Agent, or Firm* — Brinks Gilson & Lione

(57) ABSTRACT

The present disclosure provides technology for preventing burst of a clutch under the driving circumstance, which enters into a road surface with a high friction coefficient after passing through a road surface with a low friction coefficient in vehicle driving; and the present disclosure determines if a wheel-lock has occurred in driving based on a factor reflecting a driving status of the vehicle; upon determining occurrence of the wheel-lock, in the case that a vehicle speed rapidly increases and a difference value between a transmission input shaft speed and an engine speed, which form a current driving gear, is larger than a set value, blocks a mechanical engagement between a clutch and a wheel, which form the current driving gear.

7 Claims, 3 Drawing Sheets

METHOD FOR PREVENTING BURST OF CLUTCH FOR VEHICLE

CROSS RELATED REFERENCE TO RELATED APPLICATION

The present application claims priority to and the benefit of Korean Patent Application No. 10-2017-0123672, filed Sep. 25, 2017, which is incorporated herein by reference in its entirety.

FIELD

The present disclosure relates to a method for preventing burst of a clutch for a vehicle under a driving circumstance entering into a road surface with a high friction coefficient after passing through a road surface with a low friction coefficient in vehicle driving.

BACKGROUND

The statements in this section merely provide background information related to the present disclosure and may not constitute prior art.

A friction material for a dry clutch, in case of performing a high speed rotation at more than a constant speed, is burnt and ground and thereby burst phenomenon of the clutch losing a friction characteristic may occur.

That is, in case of forcibly performing a high speed driving at a state with a low gear engaged, there may occur the burst phenomenon while the clutch operates a high speed rotation.

Accordingly, although a control for maintaining the rotation number of the clutch within a constant range by a shifting pattern is performed so that the burst phenomenon of the clutch is not caused, there occurs the case that does not correspond the rotation number of the engine to a ratio of an upper gear due to a gear shifting problem of the upper gear and the like; and in this case, the gear is released into neutral to thereby escape the burst circumstance of the clutch.

However, we have discovered that there is the problem that in the case that the vehicle enters into a low friction road, under the circumstance that a wheel-lock occurs by the phenomenon that a friction force of the road surface instantaneously lowers, if the rotation number of the wheel rapidly increases as the vehicle escapes the low friction road and the friction force of the road surface rapidly increases, it may be difficult to perform such determination to thereby occur the burst phenomenon of the clutch.

The foregoing is intended merely to aid in the understanding of the background of the present disclosure, and is not intended to mean that the present disclosure falls within the purview of the related art that is already known to those skilled in the art.

SUMMARY

The present disclosure is proposed to provide a method for preventing burst of a clutch for a vehicle that prevents the burst of the clutch under a driving circumstance entering into a road surface with a high friction coefficient after passing through a road surface with a low friction coefficient in vehicle driving.

A configuration of the present disclosure for achieving the object may be characterized by including a wheel-lock determining step determining, in a controller, if the wheel-lock has occurred in driving, based on a factor reflecting a driving status of a vehicle; and upon determining occurrence of the wheel-lock in the controller, in the case that a vehicle speed rapidly increases and a difference value between a transmission input shaft speed and an engine speed, which form a current driving gear, is larger than a set value, a blocking step blocking a mechanical engagement between a clutch and a wheel, which form the current driving gear.

The wheel-lock determining step may determine if a vehicle speed is less than a reference vehicle speed; a target driving gear is a driving gear that is less than a certain driving gear; and a brake is an off status.

The blocking step, in the case that an angular acceleration of the transmission input shaft forming the current driving gear is more than a set value, or a current vehicle speed is more than a maximum vehicle speed that may be implemented in the current driving gear, may determine as a status that the vehicle speed rapidly increase.

The blocking step may release the clutch forming the current driving gear.

The blocking step may release a gear of the driving gear forming the current driving gear.

The present disclosure may include before the wheel-lock determining step, determining if a stability control system or posture control device of a vehicle body is abnormally operated.

The present disclosure may include before the wheel-lock determining step, determining if a wheel speed sensor fails.

Through the above, the present disclosure has the effects that, upon entering into a road surface with a high friction coefficient after passing through a road surface with a low friction coefficient in a high speed driving of a vehicle, releases the engagement of a clutch and a gear to prevent the burst phenomenon of the clutch, thereby securing durability of the clutch and also, securing driving stability of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
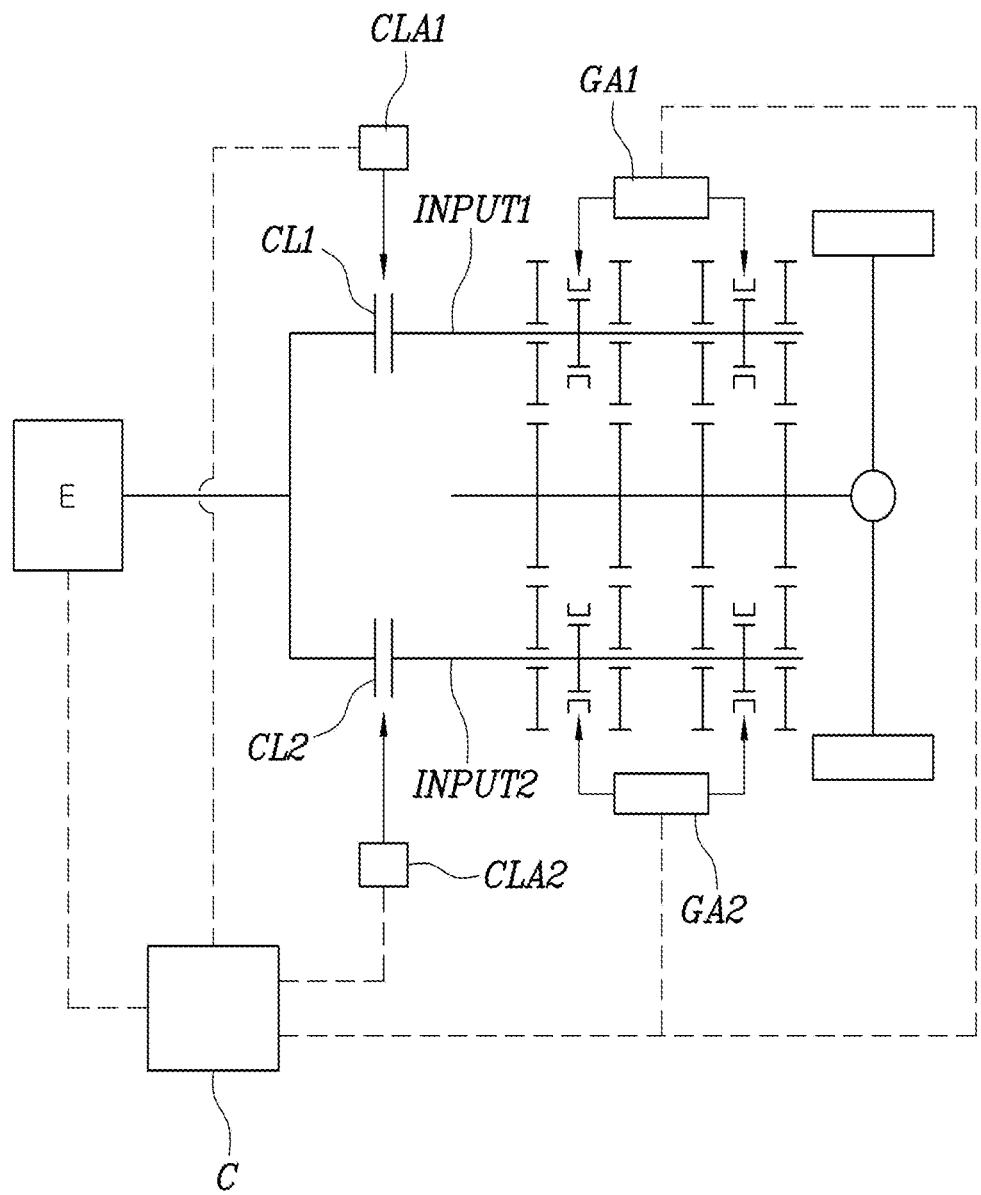
FIG. 1 is a view illustrating, as an example, a structure of a power train for a vehicle with a dual clutch transmission (DCT), which may be applied to the present disclosure, mounted.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a preferred embodiment of the present disclosure will be described in detail with reference to the accompanying drawings.

FIG. 1 illustrates a configuration of a DCT vehicle (a vehicle with a dual clutch transmission) that may be applied to the present disclosure; to briefly explain each component illustrated in the drawing, a first clutch and a second clutch are designated by reference numerals CL1 and CL2, respectively, of two clutches included in the DCT; a first clutch actuator and a second clutch actuator operating the above are designated by reference numerals CLA1, CLA2, respectively; and a first input shaft and a second input shaft are designated by reference numerals INPUT1 and INPUT2, respectively.

And, although the present disclosure describes only the structure of the power train with the DCT mounted thereto, it may be also applied to a vehicle with an automated manual transmission (AMT) mounted therein.

Meanwhile, a method for preventing burst of the clutch for vehicle of the present disclosure may be configured to include a wheel-lock determining step and a clutch releasing step.

Figure 2:
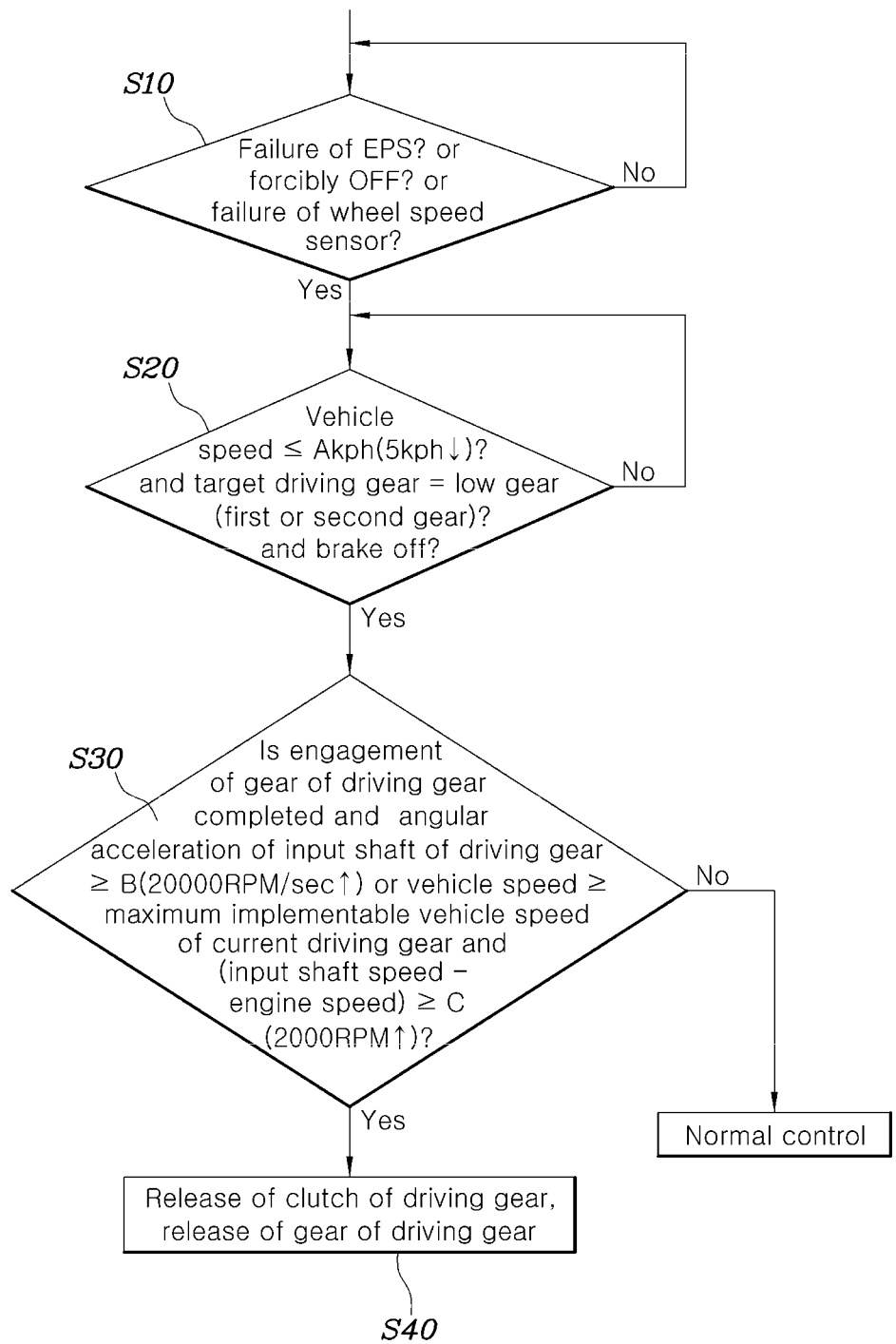
FIG. 2 is a flowchart illustrating a control flow with respect to the method for preventing burst of the clutch according to the present disclosure.
Figure 3:
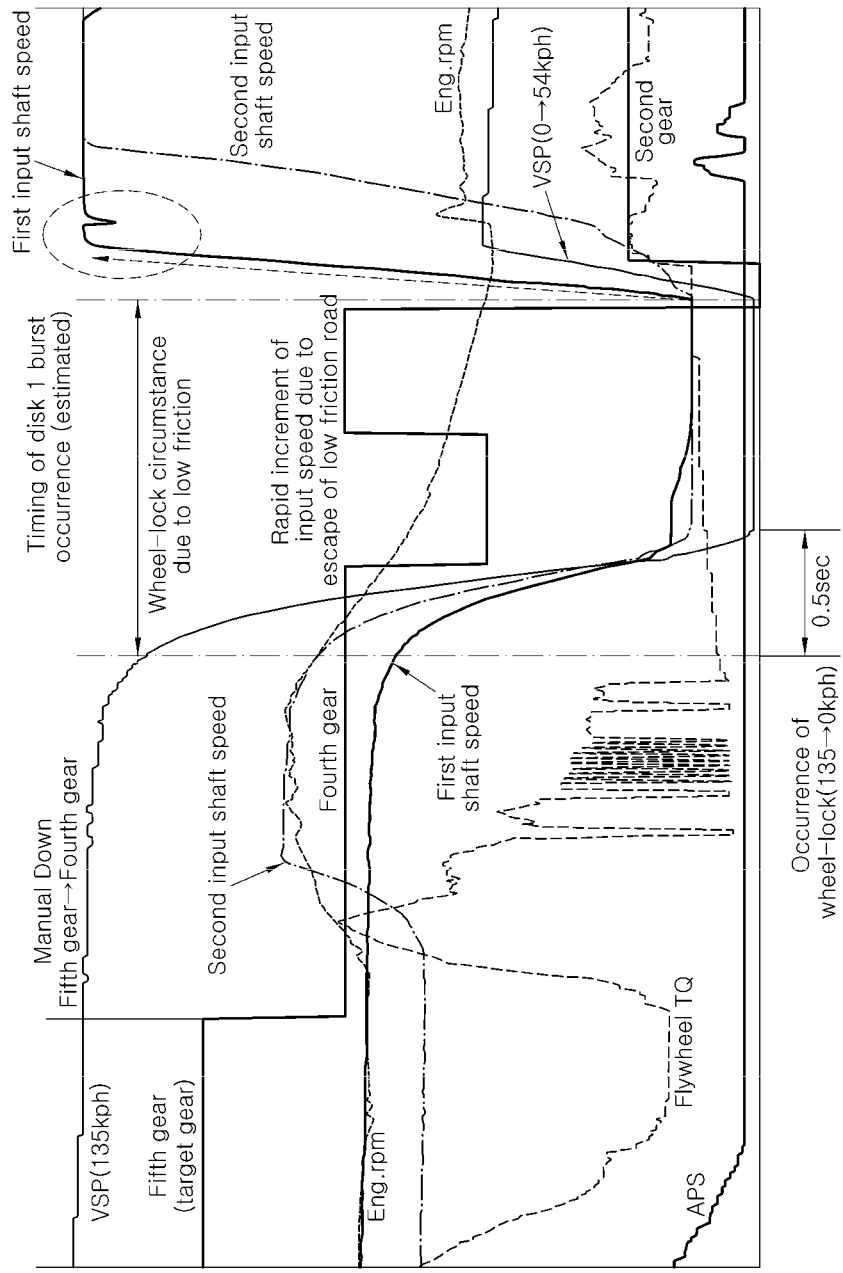
FIG. 3 is a graph explaining the movement of the vehicle upon entering into a high friction road after passing through a low friction road according to the present disclosure.

To specifically describe the present disclosure referring to FIGS. 2 and 3, first, the wheel-lock determining step S20 may determine, in a controller (C), if the wheel-lock has occurred in driving based on a factor reflecting a driving status of the vehicle.

For example, in case of determining if a current vehicle speed is less than a reference vehicle speed; a target driving gear upon the demand for a gear shifting is a driving gear less than a certain driving gear; and a brake is an off status and satisfying all of the above conditions, it may be determined that the wheel-lock occurs at step S20. Herein, the vehicle speed may be a vehicle speed calculated based on the information measured in an input shaft speed sensor.

In the blocking step S40, the controller (C), upon determining that the wheel-lock occurs through the wheel-lock determining step, in the case that the vehicle speed rapidly increases; a difference value between a transmission input shaft speed and an engine speed, which form a current driving gear, is larger than a set value, may perform a control for blocking a mechanical engagement between the clutch and the wheel, which form the current driving gear.

For example, in the case that an angular acceleration of the transmission input shaft forming the current driving gear, is more than a set value, it may be determined that the vehicle speed rapidly increases in step S30.

Or, in the case that a current vehicle speed is more than a maximum vehicle speed that may be implemented in the current driving gear, it may be determined as the status that the vehicle speed rapidly increases in step S30.

That is, based on the shifting pattern being set, assuming an opening rate of an APS as 100%, in the case that the current vehicle speed is more than a maximum vehicle speed that may be implemented in the current driving gear, it may be determined as the status that the vehicle speed rapidly increases in step S30.

Particularly, through determination of the difference value between the transmission input shaft speed and the engine speed, it is possible to determine the driving circumstance that the vehicle enters into a high friction road after passing through a low friction road in a high speed driving and to thereby distinguish it from a general acceleration circumstance.

Further, in the blocking step S40, it is possible to release the clutch forming the current driving gear so as to block the mechanical engagement between the clutch and the wheel, which form the current driving gear.

Further, in the blocking step S40, it is possible to release a gear of the driving gear forming the current driving gear so as to block the mechanical engagement between the clutch and the wheel, which form the current driving gear.

That is, it is possible to release the clutch and/or the gear of the driving gear, which form the current driving gear, thereby blocking that a high speed rotation delivered from the wheel is delivered to the clutch.

Further, before the wheel-lock determining step, it is possible to determine if a posture control device of a vehicle body is abnormally operated in step S10.

Further, before the wheel-lock determining step, it is possible to determine if a wheel speed sensor is normally operated in step S10.

That is, in the case that the posture control device of the vehicle body such as an electronic stability program (ESP) and the like is normally operated, since upon entering into a low friction road, it is entered into a control for escaping the low friction road based on the wheel vehicle speed, under the circumstances that the posture control device of the vehicle body is abnormally operated or the wheel speed sensor fails, it is possible to perform a control for entering into the logic of the present disclosure.

Meanwhile, referring to FIG. 2, to describe a control flow of the method for preventing the burst of the clutch for the vehicle according to the present disclosure as an example, it determines if the EPS fails or forcibly becomes off, or the wheel speed sensor fails (S10).

Upon determining as the abnormal operation circumstance of the EPS or the wheel speed sensor, while the vehicle speed is reduced to be less than a reference speed A kph (e.g. 5 kph) in a high speed driving of the vehicle, the shifting of the target driving gear from a high gear being more than a fifth gear to a low gear being less than a second gear proceeds; and if the brake is an off status, it is determined that the vehicle enters into a low friction road such as an icy road and the like and thereby the wheel-lock occurs (S20).

Upon determining occurrence of the wheel-lock, in the case that the driving gear is a first gear, if the angular acceleration of the transmission input shaft forming the first gear at the status that the engagement of the first gear is completed is more than a set value B revolutions per minute/sec (RPM/sec), or the vehicle speed is more than a maximum vehicle speed that may be implemented by the first gear, it is determined as the status that the vehicle speed is rapidly increasing.

In this case, in the case that a difference between the transmission input shaft speed and the engine speed, which form the first gear, is more than 2000 RPM, since the vehicle enters into a high friction road after escaping a low friction road, it is determined as the driving circumstance that the transmission input shaft due to the rotation of a driving wheel is rotated at a high speed (S30).

As such, in the case that the transmission input shaft is rotated at a high speed, it is possible to release the clutch forming the first gear and thereby release the first gear, thereby preventing the burst phenomenon of the clutch (S40).

As described above, the present disclosure, under the driving circumstance that enters into a road surface with a high friction coefficient after passing through a road surface with a low friction coefficient in a high speed driving of the vehicle, releases the engagement of the clutch and the gear to thereby prevent the burst phenomenon of the clutch, thereby securing durability of the clutch and also securing the driving stability of the vehicle.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for preventing burst of a clutch for a vehicle comprising:
    a wheel-lock determining step determining, in a controller, if a wheel-lock has occurred in driving, based on a factor reflecting a driving status of the vehicle; and
    upon determining occurrence of the wheel-lock in the controller, in a case that a vehicle speed rapidly increases and a difference value between a speed of a transmission input shaft and an engine speed, for a current driving gear, is larger than a set value, a blocking step blocking a mechanical engagement between the clutch and a wheel, which form the current driving gear.

2. The method for preventing the burst of the clutch for the vehicle according to claim 1,
    wherein the wheel-lock determining step determines if the vehicle speed is less than a reference vehicle speed; a target driving gear is a driving gear that is less than a certain driving gear; and a brake is an off status.

3. The method for preventing the burst of the clutch for the vehicle according to claim 1,
    wherein the blocking step, in a case that an angular acceleration of the transmission input shaft forming the current driving gear is more than a set value of the angular acceleration, or a current vehicle speed is more than a maximum vehicle speed that may be implemented in the current driving gear, determines as a status that the vehicle speed rapidly increases.

4. The method for preventing the burst of the clutch for the vehicle according to claim 1,
    wherein the blocking step releases the clutch from the current driving gear.

5. The method for preventing the burst of the clutch for the vehicle according to claim 1,
    wherein the blocking step releases a gear of the driving gear from the current driving gear.

6. The method for preventing the burst of the clutch for the vehicle according to claim 1, comprising, before the wheel-lock determining step, determining if a posture control device of a vehicle body is abnormally operated.

7. The method for preventing the burst of the clutch for the vehicle according to claim 1, comprising, before the wheel-lock determining step, determining if a wheel speed sensor fails.

* * * * *